United States Patent [19]
Goodman

[11] 3,978,462
[45] Aug. 31, 1976

[54] DRAINAGE FLOW DETECTOR

[76] Inventor: Clark Goodman, 95 Antigua Court, Coronado, Calif. 92118

[22] Filed: Aug. 6, 1975

[21] Appl. No.: 602,431

[52] U.S. Cl. ............................. 340/243; 128/2.08; 340/239 R; 73/194 R
[51] Int. Cl.² ........................................ G08B 21/00
[58] Field of Search ............... 340/243, 239 R, 240, 340/241, 271; 235/151.34; 73/149, 194 R, 228, 229; 128/2.08

[56] References Cited
UNITED STATES PATENTS

| | | | |
|---|---|---|---|
| 1,164,882 | 12/1915 | Sommer | 340/243 |
| 3,284,788 | 11/1966 | Hudson | 340/239 R X |
| 3,363,461 | 1/1968 | Minkoff | 73/149 X |
| 3,425,274 | 2/1969 | Clement et al. | 73/194 |
| 3,605,729 | 9/1971 | Liu et al. | 128/2.08 |
| 3,757,316 | 9/1973 | Fiorenzo | 340/243 |
| 3,813,597 | 5/1974 | Le Vitt | 73/229 X |

FOREIGN PATENTS OR APPLICATIONS

| | | | |
|---|---|---|---|
| 28,611 | 12/1896 | United Kingdom | 340/243 |

Primary Examiner—John W. Caldwell
Assistant Examiner—Daniel Myer
Attorney, Agent, or Firm—Kenyon & Kenyon Reilly Carr & Chapin

[57] ABSTRACT

A drainage flow detector for predicting the clogging of drain lines in which the difference in the time required for air to be exhaled from the drain vent upon discharge of a quantity of waste and the time to inhale that amount of air as the waste drains is determined and compared with predetermined values to give an indication of proper drain operation.

9 Claims, 4 Drawing Figures

DRAINAGE FLOW DETECTOR

Background of the Invention

This invention relates to flow indicators in general and more particularly to an improved drainage flow detector which permits predicting clogging in a waste water drain before complete blockage and the serious problems associated therewith occur.

Water which is distributed to toilets, basins, sinks, tubs, bowls and other fixtures in dwellings and other buildings and also distributed to tanks and other equipment in industrial establishments is collected as spent water by the drainage system of the building and run to waste. Plumbing fixtures are arranged singularly or in groups. Horizontal drains from each of the single fixtures run into substantially vertical stacks where they run down to a building drain or sub-drain. Naturally, the vertical stacks must permit a free flow of the water if water is not to back up into fixtures particularly on the lower floors. Discharging fixtures send water rushing into the drain and tumbling down the stacks. Air is dragged along and air pressure above or below atmospheric would be created within the system and might unseal traps or water seals were it not for a provision of vents in the system. These vents lead from the vertical stacks to the atmosphere and thereby equalize the air pressure in the drainage pipes.

While clean-out plugs are located in various parts of the drainage system it is not customary to have flow meters or monitoring means for the build up of scale or scum inside the pipes or accumulation of sand or mud in traps except possibly at a central location as described in the patents mentioned below. Thus, should a blockage occur other than in the main sewer line it is not until a line is plugged up and backs up that cleaning takes place either mechanically or through the application of chemicals such as lye or acids. The type of damage which can occur through flooding along with the serious inconvenience such a back up causes is quite evident.

Because of such problems various devices have been developed to detect blockage, but basically only in a sewer line. Typical of these sewer cleansing alarms or sensors are those disclosed in U.S. Pat. Nos. 2,985,187, 3,774,187 and 3,559,197 . It is evident, that each of these relies on complex electrical and mechanical devices to obtain the necessary indications. In particular U.S. Pat. No. 2,985,187 requires a special perforated tubular housing, a mercury switch and various rods and other devices operated by a float. U.S. Pat. No. 3,559,197 discloses a quite complex device which includes a vane structure in the flow passage. U.S. Pat. No. 3,774,187 is a device similar to that of U.S. Pat. No. 2,985,187 in that it uses a float type device associated with an essentially lateral portion of the sewer system. These prior art devices aside from their complexities have other disadvantages. In the first place they must be more or less permanently installed in the system. Secondly, devices such as this if calibrated to not respond under various operating conditions which may occur may then not respond until serious clogging has taken place. Furthermore as alluded to above, these devices are generally centrally located.

Thus, the need for a simpler apparatus to perform this function and preferably such an apparatus which is portable and need not be permanently installed becomes evident. This latter capability is of particular interest if the device is to be used in large buildings such as apartment houses. To use the devices of the prior art in such an application would require numerous devices if proper isolation of the area of blockage were to be accomplished.

SUMMARY OF THE INVENTION

The present invention solves this problem in simple and inexpensive fashion. It gives an early warning of decreased flow in the existing system. It is add-on test equipment either portable or permanent as the need requires and does not in any way interfere with the operation of the drainage system. Furthermore it can be easily installed without any change in the design or construction of the system. In essence, the basic principle of the present invention resides in measuring the rate of air venting. In simplest terms the breathing of the drainage system serves as a measure of its effectiveness. Each time water is discharged into the vertical stacks air is expelled therefrom through the vent. As the water drains out air is drawn back into the vertical stack. As the system clogs, its intake and exhaust of air changes in rate. When monitoring this rate, either periodically or continuously, the occurence of plugging can be anticipated and corrective measures taken well in advance of flooding.

In contrast to the prior art systems in which the water was measured, vented air can be measured using simple inexpensive devices. Thus, there is disclosed a simple device for generating electrical pulses proportional to the rate of exhaust and intake and for a simple electronics means for processing these pulses to provide an output indication of drain effectiveness and, if desired, to activate an alarm.

Detailed Description of the Preferred Embodiment

Figure 1:
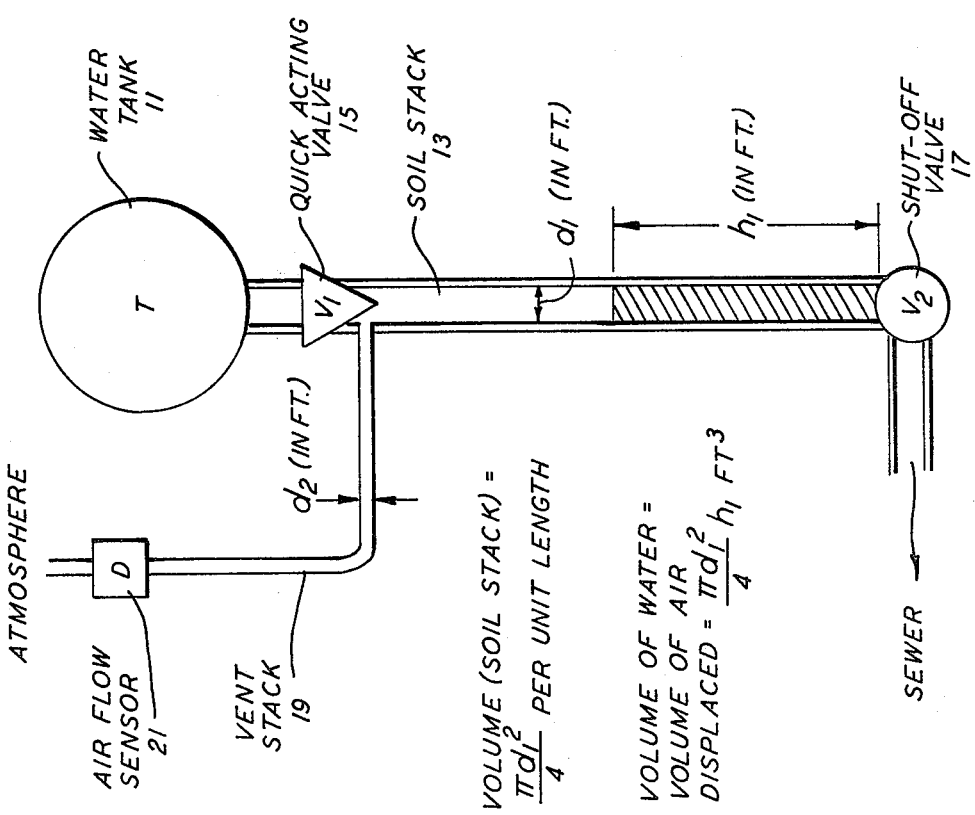
FIG. 1 is a schematic illustration of a portion of a drainage system helpful in understanding the operation of the present invention.

It will be recognized that in apartments and other large buildings a number of drainage circuits are provided. That is to say a plurality of vertical soil stacks coupled to various fixtures will be provided. To each of these vertical stacks is attached a vent stack for venting air therefrom. FIG. 1 illustrates a portion of such a system and also provides a model helpful in understanding the operation of the present invention.

FIG. 1 illustrates a water tank II coupled to a soil stack 13 through a quick acting valve 15. The quick acting valve 15 may comprise the flushing mechanism on a toilet, for example. Shown at the end of the soil stack 13 is a shut off valve 17. This valve leading to the sewer does not in fact exist in most cases but is used only as a model to better explain the present system. Assume that a cubic foot of water is suddenly dumped into the empty soil stack through the quick acting valve 15. The water quickly rises to a height h1 in the stack if the shut off valve 17 is closed. Exactly one cubic foot of air is forced out through the vent stack 19. Shown in this vent stack 19 is an air flow sensor 21 according to the present invention and which will be described in more detail below. If the shut off valve 17 is now opened, the water is discharged to the sewer and one cubic foot of air is sucked back through the vent stack and recorded by the air flow sensor 21.

Figure 2:
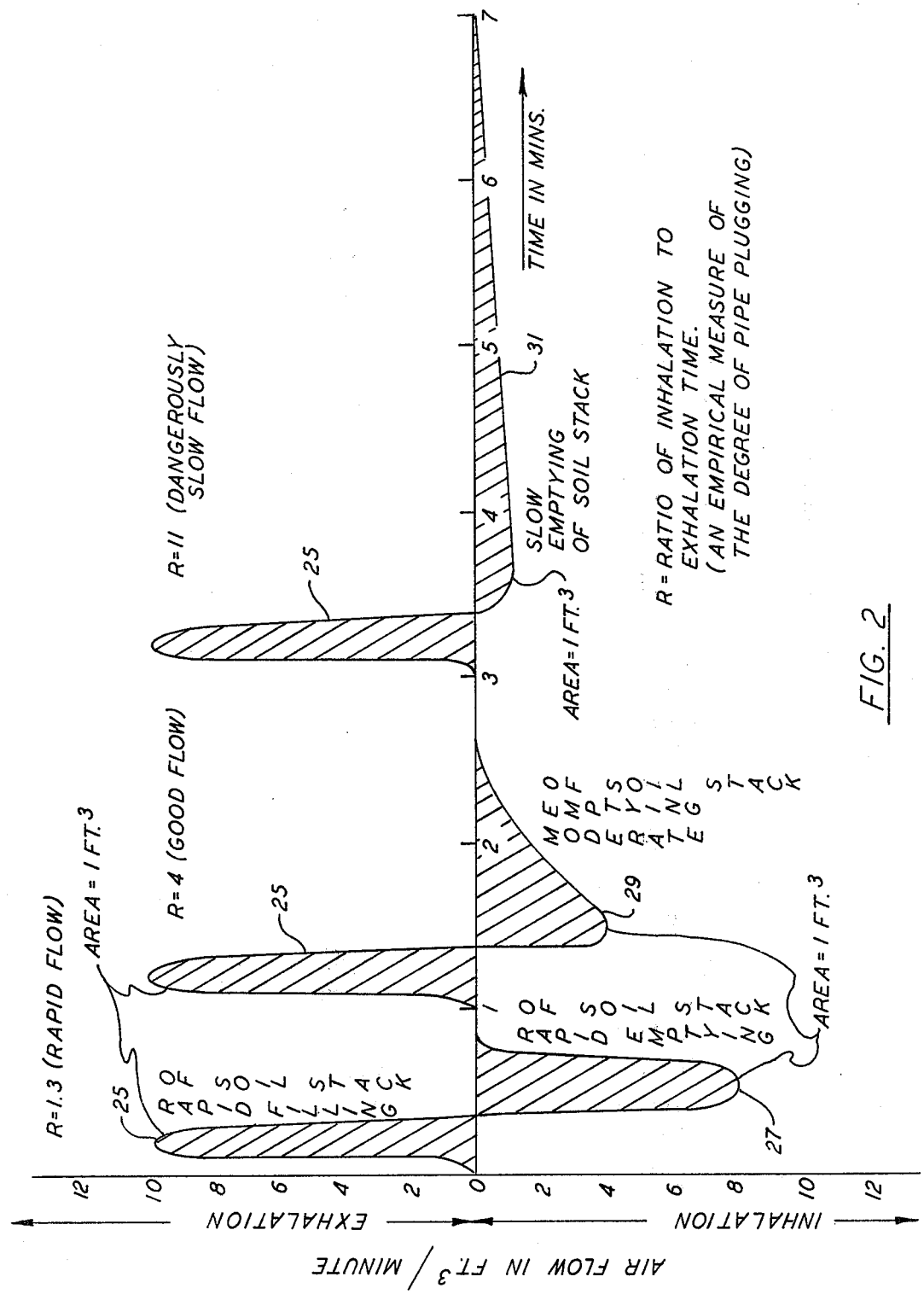
FIG. 2 is a curve illustrating the type of outputs obtained from the system of FIG. 1.

The rate at which the water flows into the sewer is determined by the size of the opening in the shut off valve 17 which in turn determines the rate at which the air re-enters the system. If the opening in 17 is small the time required to empty the soil stack is long. If the opening in the valve 17 is large the time required to empty the soil stack is short as is the time for the air to re-enter the system. This is illustrated on FIG. 2. Shown is a pulse 25 representing a volume of 1 cubic foot. It results in a maximum rate of approximately 10 cubic feet per minute of exhalation. Shown next to it and below it is another pulse, also representing a volume of 1 cubic foot representing the inhalation time. In this example the inhalation takes place quite quickly with a maximum flow rate of about eight cubic feet per minute. This represents a ratio of 1.3 between the time of exhalation and time of inhalation. This is a rate representing a very rapid flow. In a second example the pulse 25 is of the same duration but the inhalation 29 is much slower. It takes in excess of one minute as compared to the time of exhalation of less than one-third minute. It results in a ratio R=4 which is still a good flow. Finally, there is illustrated, with a further exhalation pulse 25, an inhalation pulse 31 which takes place over a time period of approximately 3 minutes. This results in a ratio of R=11 and represents a dangerously slow flow. Thus, the ratio of the two time intervals indicates the degree of obstruction in the drainage system. By measuring flows and determining ratios either continuously or periodically drains associated with each vent stack can be easily checked. For example, in an apartment or office building with multiple vent stacks, periodic measurements of the various parts of the system may be done using a single portable test unit. Alternatively if desired multiple sensors may be permanently installed in the several vents with connections to a central reporting center equipped with calibrated alarm devices.

Figure 3:
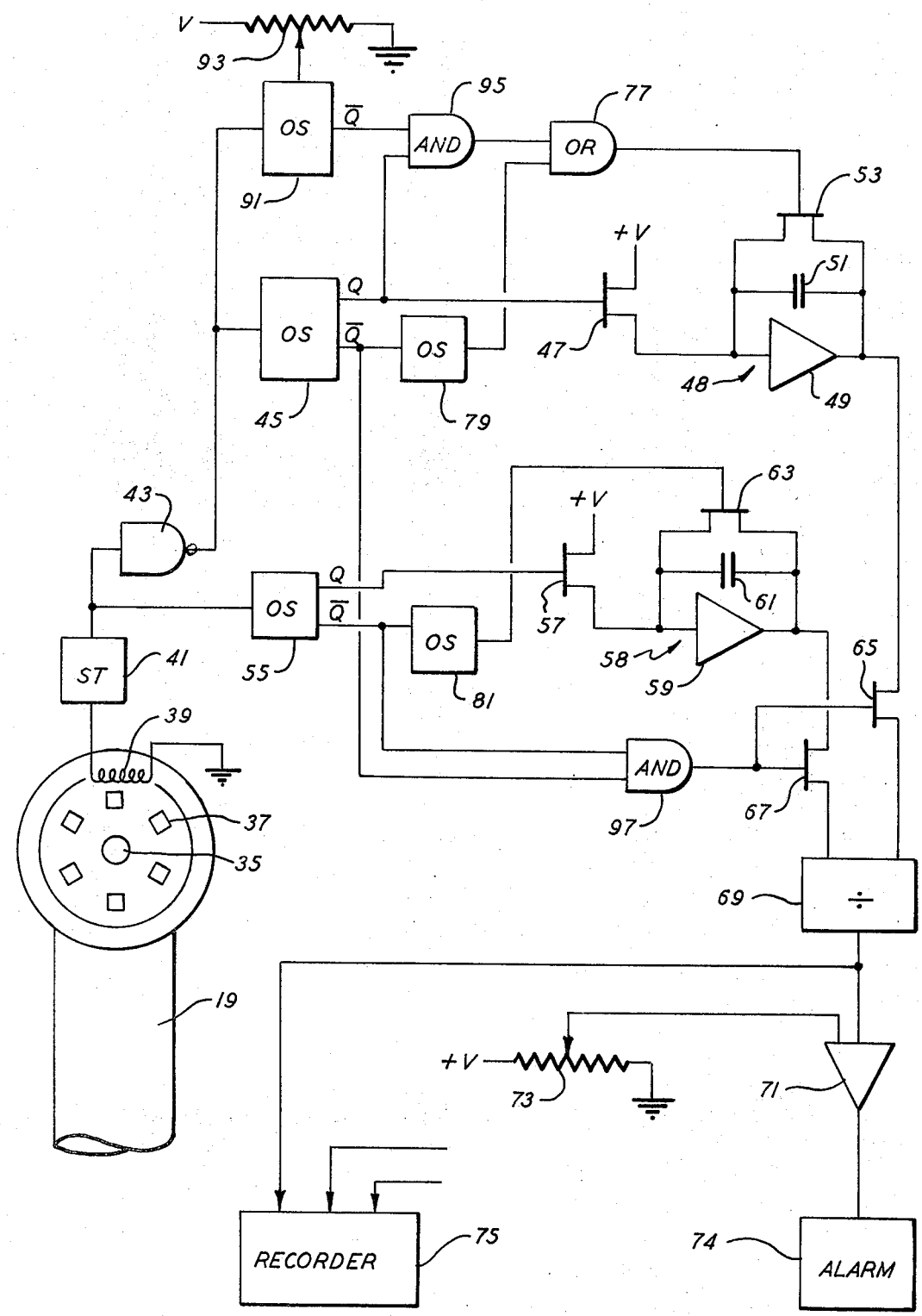
FIG. 3 is a schematic diagram of the air flow sensor of FIG. 1.

FIG. 3 illustrates an electric schematic of an air flow sensor which can be used as the air flow sensor of the present invention. A vane structure 35 in which each vane has a magnet 37 on the end thereof is used. Structures like this are well known and have been used for many applications such as speed indicators on boats and the like. The magnets pass a coil 39 inducing currents therein. The output from the coil 39 can be directed through a pulse shaper 41 such as Schmidt trigger. The pulses will be either positive or negative depending on the direction of rotation of the vane mechanism 35 which is placed on top of the vent stack 19. It is assumed that for exhalation the pulses will be negative and for inhalation will be positive. The negative pulses are inverted through an inverter 43 and provided as inputs to a retriggerable one shot multivibrator 45. When triggered it will have a Q output which is provided as an input to turn on a FET switch 47 which couples a positive voltage to an integrator 48 comprising an operational amplifier 49 and capacitor 51. Across the capacitor 51 is a FET switch 53 for resetting the integrator. Similarly the output is directly coupled to a retriggerable one shot 55 whose Q output turns on a FET switch 57 to provide an input to an integrator 58 made up of amplifier 59 and capacitor 61. A FET switch 63 is placed across the capacitor 61 for resetting. The outputs of amplifiers 49 and 59 are provided through FET switches 65 and 67 respectively to an analog divider 69. The output of analog divider 69 is provided to a comparator 71 having a reference input from a potentiometer 73. The output of the comparator 71 is coupled to an alarm 73 which may be a light, bell or the like. The output of the analog divider 69 is also shown as being coupled to a chart recorder 75 which can have additional inputs from similar devices at other locations. In the integrator 48 capacitor 51 is reset by the FET switch 53 which in turn is turned on by an output from an OR gate 77 obtaining one input from a one shot multivibrator 79 coupled to the $\overline{Q}$ output of one shot 45. Similarly, the FET switch 63 is turned on to reset the integrator 58 capacitor 61 by an output from one shot 81 which is triggered by the $\overline{Q}$ output of one shot 55. Capacitor 51 is also set in response to a Q signal from one shot 45 and a $\overline{Q}$ signal from a one shot multivibrator 91 as Anded in AND gate 95.

In operation, the system will first exhale in response to water being dumped in the soil stack 19. Negative pulses will be generated and inverted through the inverter 43 to trigger the one shot 45. It will go into the Q state and remain there as long as pulses are received. This turns on the FET switch 47 causing the integrator 48 to integrate. It will be recognized that a problem can exist in a building where multiple discharges are taking place and overlap. From FIG. 2 it becomes evident that each discharge pulse is essentially identical to each other discharge pulse and takes place over a relatively constant time. One shot 91 is used to take advantage of this fact. At the beginning of an exhalation, one shot 91 is triggered. Its delay time is set by means of an external resistor 93 in conventional fashion to be slightly greater than a typical exhalation time. After that time it will return to the $\overline{Q}$ state, i.e., it is triggered only by the first pulse and is not retriggered as are one shots 45 and 55. If it returns to the $\overline{Q}$ state and one shot 45 is still in the Q state, this means an improper input, i.e., more than one exhalation pulse, is being received and an output from AND gate 95 will be transmitted through OR gate 77 to close the FET switch 53 to immediately reset the integrator 48. If a normal pulse is received, one shot 45 will have been out of the Q state and into the $\overline{Q}$ state before one shot 91 goes to a $\overline{Q}$ state and a reset will not take place. When one shot 45 changes state at the end of the input pulses, a one shot 79, set to have a sufficient delay to enable inhalation and a comparison to be made, is triggered. A value proportional to the time of the exhalation pulse is now stored in the integrator 48.

Inhalation now takes place and pulses generated in response thereto are used continually retrigger the one shot 55 as long as they occur. It thus turns on the FET switch 57 to provide a voltage to the integrator 58 which integrates until the pulses stop and the one shot 55 goes to the $\overline{Q}$ state. At this point, both one shot 45 and one shot 55 will be in the $\overline{Q}$ state enabling an AND gate 97 which turns on the two FET switches 65 and 67 providing the respective stored values in integrators 48 and 58 to an analog divider 69 where their ratio is determined. The ratio is compared in a comparator 71 with a preset value set in on a resistor 73. This can be pre-calibrated for making measurements on a known good system and/or through appropriate computations. If the ratio is greater than the preset value, an output from the comparator 71 triggers an alarm 73. The analog ratio may also be recorded on a strip recorder 75. This permits having a running account of the ratio to determine if a blockage is slowly occurring. Once sufficient time for measurement has taken place the one shots 79 and 81 respectively will reset their integrators 48 and 58.

Figure 4:
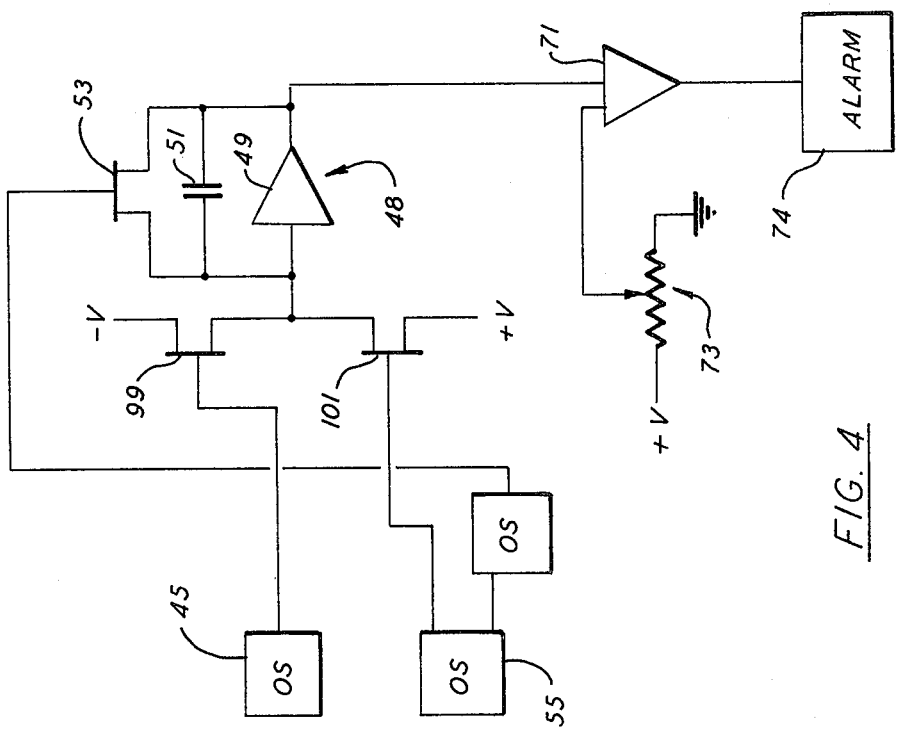
FIG. 4 is a schematic diagram of an alternate embodiment of the air flow sensor of FIG. 1.

A simplified form of arrangement is shown on FIG. 4. In this arrangement, which can also have associated with it the one shot 91 and gates 95 and 77 of FIG. 3 which are not shown for sake of simplicity, only a single integrator is used. The output from the one shot 45 turns on a FET switch 99 which is coupled to a negative voltage and the one shot 55 turns on a FET switch 101 which is coupled to a positive voltage. The integrator 48 first integrates down in response to the negative voltage whereupon it then integrates up in response to the positive voltage, through the FET switch 101. The result is the difference between the two times rather than the ratio. This difference is provided to the comparator 71 where it is again compared with a preset value from a potentiometer 73, to activate the alarm 74.

It will be evident to those skilled in the art that the vane arrangement 35 can be either permanently installed on one or more drain stacks or, may be made, along with its associated electronics, as a portable unit which can be moved from drain vent to drain vent. For example the equipment can be used by a plumber or a maintenance man in a large apartment building.

Thus, an improved drainage flow detector which is simple and easy to operate and can be used in both permanent and portable form has been illustrated and described. Although a specific embodiment has been shown, it will be obvious to those skilled in the art that various modifications may be made without departing from the spirit of the invention which is intended to be limited solely by the appended claims.

What is claimed is:

1. An improved drainage flow detector for predicting drainage blockages in a drain stack having an associated vent comprising:
   a. means to measure the exhalation and inhalation of air from the vent stack in the drainage system and to provide outputs indicative thereof;
   b. means having said outputs as inputs to compare the length of time of an associated exhalation and inhalation in response to a quantity of liquid being dumped into a drain stack associated with said drain vent; and
   c. means to provide an output indicative of said comparison.

2. Apparatus according to claim 1 wherein said means to compare comprise means to determine the ratio of exhalation to inhalation time.

3. Apparatus according to claim 2 wherein a voltage proportional to said ratio is provided as an output and further including means to record said voltage.

4. Apparatus according to claim 2 wherein said means to provide an output comprise means to provide an output indicating a ratio exceeding a predetermined value.

5. Apparatus according to claim 3 wherein said means providing an output also provides an output voltage proportional to said ratio and further including means to record said voltage.

6. Apparatus according to claim 1 wherein said means for generating an output proportional to inhalation and exhalation comprise a rotating vane structure having a plurality of blades containing thereon magnets and means to sense the passage of said magnets at a fixed point and provide pulses indicative thereof.

7. Apparatus according to claim 1 and further including means to distinguish between a single exhalation and inhalation and a flow caused by overlapping inhalations and exhalations.

8. Apparatus according to claim 1 wherein said detector is permanently attached to a drain vent.

9. Apparatus according to claim 1 wherein said detector is portable.

* * * * *